United States Statutory Invention Registration [19]

[11] Reg. Number: H680

Alfing et al. [43] Published: Sep. 5, 1989

[54] TDD ANTENNA—FOIL FORMED, SUBSTRATE LOADED LASER WELDED ASSEMBLY

[75] Inventors: Norman F. Alfing; Robert C. Breithaupt, both of Tucson, Ariz.

[73] Assignee: The United States of America as represented by the Secretary of the Air Force, Washington, D.C.

[21] Appl. No.: 864,221

[22] Filed: May 19, 1986

[51] Int. Cl.[4] ..... H01Q 13/00; H01Q 1/28

[52] U.S. Cl. ..... 343/785; 343/708; 29/600; 333/239

[58] Field of Search ..... 343/708, 784, 785, 911 R, 343/708, 784; 29/600; 333/239, 240

[56] References Cited

U.S. PATENT DOCUMENTS

| | | | |
|---|---|---|---|
| 3,346,865 | 10/1967 | Jones, Jr. | 343/708 |
| 3,509,571 | 4/1970 | Jones, Jr. | 343/708 |
| 3,686,590 | 8/1972 | Dischert | 333/239 |
| 3,798,652 | 3/1974 | Williams | 454/343 |
| 3,801,939 | 4/1974 | Lamy et al. | 333/239 |
| 3,823,404 | 7/1974 | Buie, Jr. | 343/708 |
| 4,010,470 | 3/1977 | Jones, Jr. | 343/708 |
| 4,051,480 | 9/1977 | Reggia et al. | 343/708 |
| 4,316,923 | 2/1982 | Monforte et al. | 333/24.1 |
| 4,431,996 | 2/1984 | Milligan | 343/708 |
| 4,494,121 | 1/1985 | Walter et al. | 343/708 |
| 4,516,131 | 5/1985 | Bayha et al. | 343/785 |

FOREIGN PATENT DOCUMENTS

| | | | |
|---|---|---|---|
| 0032806 | 4/1981 | Japan | 343/785 |

OTHER PUBLICATIONS

HDL Technical Disclosure Bulletin, Miniaturized Dielectric Loaded Waveguide Antenna, Jones, Jr., 3/64.

"Radiation from Ferrite Filled Apertures", Angelakos, D. J. et al, Proceedings of the IRE, vol. 44, No. 10, Oct. 1956.

*Primary Examiner*—Stephen C. Buczinski
*Assistant Examiner*—Linda J. Wallace
*Attorney, Agent, or Firm*—William G. Auton; Donald J. Singer

[57] ABSTRACT

The antenna assembly is formed by building a shell housing by punch press operation. The housing contains the antenna features. The dielecric with load and connector is placed into the housing. Then a back is placed onto the assembly and the unit is enclosed by laser welding. This design allows the fabrication of the housing to be constructed with the antenna features built in and is simpler and less costly than prior designs.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TDD ANTENNA—FOIL FORMED, SUBSTRATE LOADED LASER WELDED ASSEMBLY

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to antenna systems intended for use on missiles; and specifically to a foil-formed, substrate loaded, laser welded antenna assembly.

Conventional antenna designs utilized in missiles are large, bulky, waveguide, coaxial or strip line structures that are mounted inside of the missile. Aside from the space they occupy, these antennas have to be designed to radiate through an air space as well as through the wall of the missile, which tends to make such systems inefficient.

The task of providing, an antenna assembly which will save space in missiles, and which has simpler and less costly fabrication requirements is alleviated to some extent, by the following U.S. Patents, the disclosures of which are incorporated herein by reference U.S. Pat. No. 3,798,652 issued to Williams;
U.S. Pat. No. 4,010,470 issued to Jones;
U.S. Pat. No. 4,431,996 issued to Milligan;
U.S. Pat. No. 4,494,121 issued to Walter et al; and
U.S. Pat. No. 4,516,131 issued to Bayha.

The above-cited references are exemplary in the art, and disclose antenna systems employed in missiles, projectiles, and radomes of aircraft. The dielectric antenna system of the Williams reference uses a dielectric rod with a monopulse feed as an antenna element. The Jones reference houses an integrated antenna within a radome for use in aircraft.

Both the Milligan and Walter et al references disclose antenna systems intended for use on missiles. The Walter et al antenna is a direction finding antenna for use in missiles. Milligan describes in great detail, a dielectric antenna system which is formed from a standard fabrication process. In Milligan, the antenna is formed by photo-etching, and machining steps to house a stripline network within a metal plating. Open circuit parallel plate radiators generally consist of a ground plane on top of which is placed a variably sized metallic radiating element in an open-circuit relationship. While useful, such designs have inherent design limitations inasmuch as the radiation frequency or tuning is controllable only as a function of the size of the radiating element. The fabrication of antenna assemblies used in missile systems is a comparatively costly process which includes etching, machining, and a series of plating operations. It is, therefore, a need to design an antenna assembly which has simplified fabrication requirements and which occupies a reduced amount of space. The present invention is intended to satisfy that need.

SUMMARY OF THE INVENTION

The present invention includes an antenna assembly intended for use on missiles. This antenna is formed by building a hell housing using the punch press operation. A dielectric with a load and a connector fits into the housing. Then a back is placed onto the assembly and the unit is enclosed by laser welding. This design allows the fabrication of the housing to be constructed with the antenna features built in and is simpler and less costly than prior designs.

It is an object of the present invention to simplify the fabrication of antenna assemblies for missiles.

It is another object of the present invention to provide an antenna assembly which occupies a reduced amount of space.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a foil formed, substrate loaded laser welded antenna assembly intended for use on missiles.

Figure 1A:
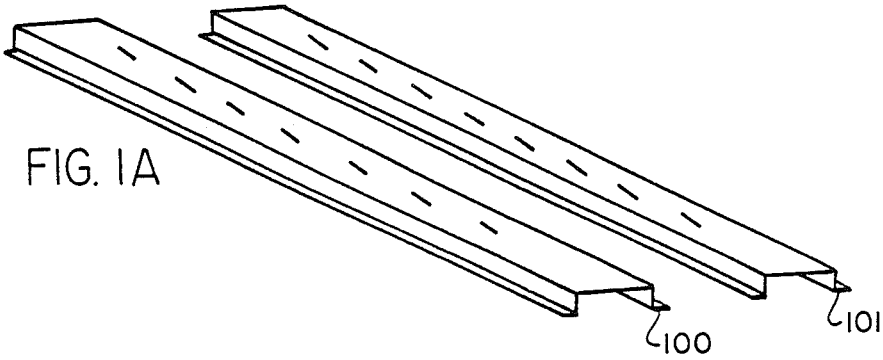
FIG. 1A is an illustration of the waveguide housing of the present invention.
Figure 1B:
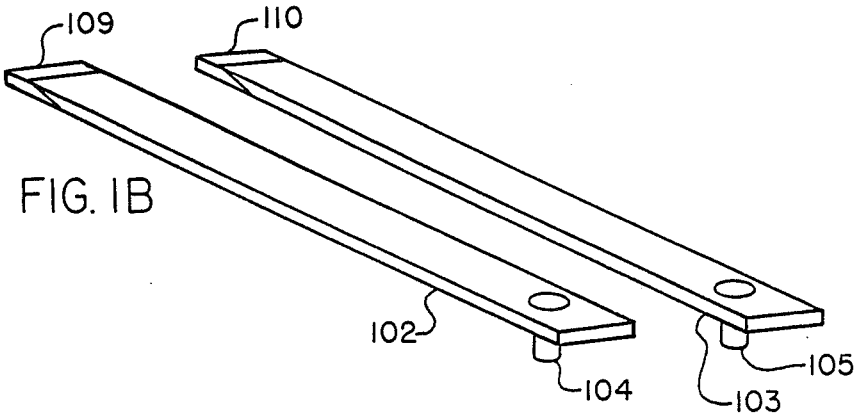
FIG. 1B is an illustration of the dielectric substrate used in the present invention.
Figure 1C:
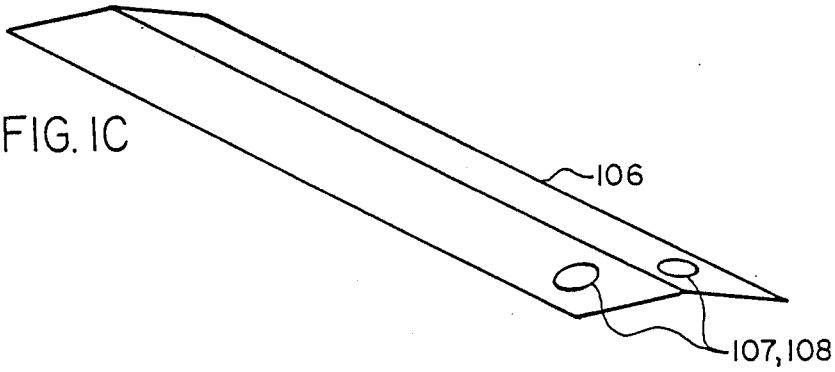
FIG. 1C is an illustration of the base plate of the present invention.

The reader's attention is now directed towards FIGS. 1A, 1B and 1C, which are illustrations of the major components of the antenna assembly. In FIG. 1A, two formed waveguides 100 and 101 are depicted. These components of the antenna assembly form a shell housing which will contain the antenna features. This shell housing of FIG. 1A is formed by punch press construction techniques.

FIG. 1B depicts the dielectric portion of the antenna elements 102 and 103 and their ferrite load elements 109 and 110. This dielectric is the load of the antenna element. This dielectric substrate is placed within a foil formed shell housing which serves as a metallic ground plane. Additionally, the dielectrics 102 and 103 each have metallic electrical connectors 104 and 105 projecting out of one end, so that they may be used as one-piece loads.

FIG. 1C is an illustration of the waveguide base plate 106, which together with the housing 100 and 101 of FIG. 1A, encapsulates the dielectric 102 and 103 of FIG. 1B. Note that the base plate 106 has two apertures 107 and 108 which align with the electrical connectors 104 and 105 of the dielectric to permit them to electrically connect with a transmitter or receiver.

Figure 2:
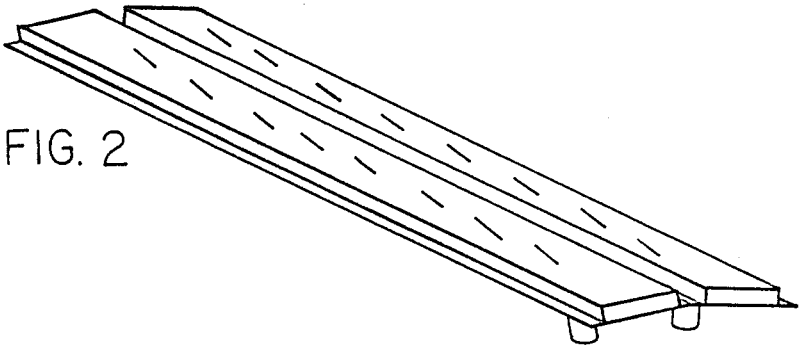
FIG. 2 is an illustration of the antenna assembly when the components of FIGS. 1A, 1B, and 1C are put together.

FIG. 2 is an illustration of the entire antenna assembly when the components of FIGS. 1A, 1B and 1C are put together. To construct this assembly the housing 100 and 101 of FIG. 1A is laser welded to the base plate 106 of FIG. 1C so that the dielectric loads 102 and 103 of FIG. 1B are encapsulated.

The waveguide housings 100 and 101 and base plate 106 are both formed from lightweight foil materials. This is typically aluminum or stainless steel. The antenna assembly can be composed of single elements, or parallel double elements, as depicted in FIG. 2.

The manufacturing of the antenna assembly, described above, is accomplished in the following steps:

1. Fine blank and form the waveguide aperture channel structure from foil material.

2. Rout the dielectric substrate blank to width and length.

3. Place the dielectric substrate with ferrite load and connector into the waveguide aperture channel.

4. Place the back panel over the parts within the fixture and laser weld to fasten and assemble the unit together.

This manufacturing operation is an extreme reduction of the number of steps conventionally used to make antenna assemblies. Conventional methods entail a series of etching, machining, plating, and joining operations which are typically accomplished in twenty separate steps.

The new design allows fabrication of a housing to be constructed with antenna features built into it. The piece parts are loaded into the housing and closed. The design allows simpler and less costly parts to be used and results in a more efficient method of manufacture.

Primarily, the advantage is a large cost savings along with higher rate production being permissible. The savings could be 10 to 12 times over the present method. Another benefit is repeatedly due to the use of punch press parts which carry the antenna features.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An antenna assembly comprising:

a dielectric substrate which is composed of dielectric materials and which serves as an antenna element in said antenna assembly, said dielectric substrate having a metallic electrical connector protruding out of one end;

a foil formed waveguide housing which is punch pressed from foil materials including aluminum and stainless steel foils to form a waveguide channel which fits over said dielectric substrate; and a base plate which is fixed to said foil formed waveguide housing to encapsulate said dielectric substrate, said base plate having an aperture which permits said metallic electrical connector from said dielectric substrate to extend out of said antenna assembly.

* * * * *